United States Patent [19]
Okubo et al.

[11] Patent Number: 5,739,533
[45] Date of Patent: Apr. 14, 1998

[54] THERMAL RADIATION DETECTOR HAVING A SPECTRAL RESPONSIVITY NOT DEPENDENT ON WAVELENGTH

[75] Inventors: Kazuaki Okubo, Takatsuki; Yasuo Nakagawa, Omiya, both of Japan

[73] Assignee: Matsushita Industrial Co., Ltd., Osaka, Japan

[21] Appl. No.: 753,852

[22] Filed: Dec. 2, 1996

Related U.S. Application Data

[63] Continuation of Ser. No. 441,690, May 15, 1995, abandoned.

[30] Foreign Application Priority Data

May 13, 1994 [JP] Japan ................................. 6-099621

[51] Int. Cl.⁶ ................................................. G01J 5/02
[52] U.S. Cl. ................................. 250/338.3; 250/353
[58] Field of Search ........................ 250/338.1, 338.3, 250/353

[56] References Cited

U.S. PATENT DOCUMENTS

| | | | |
|---|---|---|---|
| 3,459,945 | 8/1969 | Astheimer et al. | 250/338.3 |
| 3,660,659 | 5/1972 | Eisenman et al. | 250/352 |
| 4,009,516 | 3/1977 | Chiang et al. | 250/338.3 X |
| 4,058,729 | 11/1977 | Sher | 250/338.3 X |
| 4,906,849 | 3/1990 | Duo et al. | 250/338.3 |

FOREIGN PATENT DOCUMENTS

| | | | |
|---|---|---|---|
| 321892 | 11/1971 | U.S.S.R. | 250/338.3 |
| 471513 | 5/1975 | U.S.S.R. | 250/338.3 |
| 504942 | 2/1976 | U.S.S.R. | 250/338.3 |

OTHER PUBLICATIONS

Blevin et al., "Infrared Reflectometry with a Cavity-Shaped Pyroelectric Detector", Applied Optics, 13(10), Oct. 1994, pp. 2212-2217.

*Primary Examiner*—Edward J. Glick
*Attorney, Agent, or Firm*—Beveridge, DeGrandi, Weilacher & Young, LLP

[57] ABSTRACT

A radiation detector has a film-like pyroelectric element which has a fan shape, and two support plates which are made of an electrical and thermal insulating resin and adhered to the both ends elongating from the pivot of the fan shape to the peripheral portion. After a radiation absorbing layer is attached to one face of the pyroelectric element, the resin plates are adhered to each other so that the layer is positioned inside and the pyroelectric element is formed into a conic shape, thereby forming a conic portion. Radiation entering an opening of the bottom face of the conic portion is absorbed by the layer in the form of heat. The temperature rise is converted by the pyroelectric element into an electric signal, thereby detecting the energy amount of the radiation. A reflected component of radiation entering the layer again enters the layer. Since the input radiation is repeatedly reflected and absorbed by the layer, the radiation is absorbed and detected with about 100% irrespective of the wavelength.

25 Claims, 17 Drawing Sheets

FIG. 1(A)
4 RADIATION ABSORBING LAYER
3 PVF2 PYROELECTRIC ELEMENT
2 MEASURED LIGHT
10mm φ
30°
1 INCIDENT APERTURE
5 SUPPORT PLATE
FIG. 1(B)
5 SUPPORT PLATE
3 PVF2 PYROELECTRIC ELEMENT
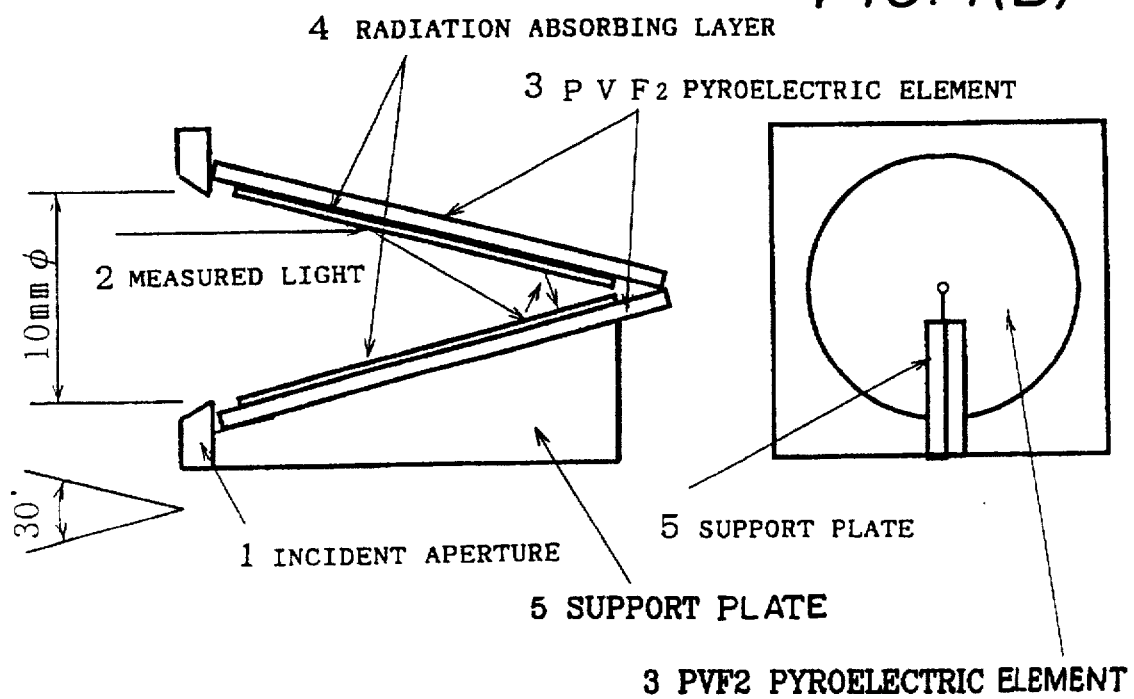
FIG. 1(C)
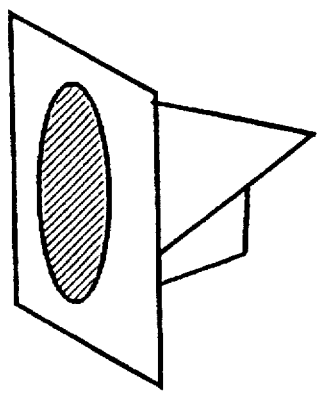

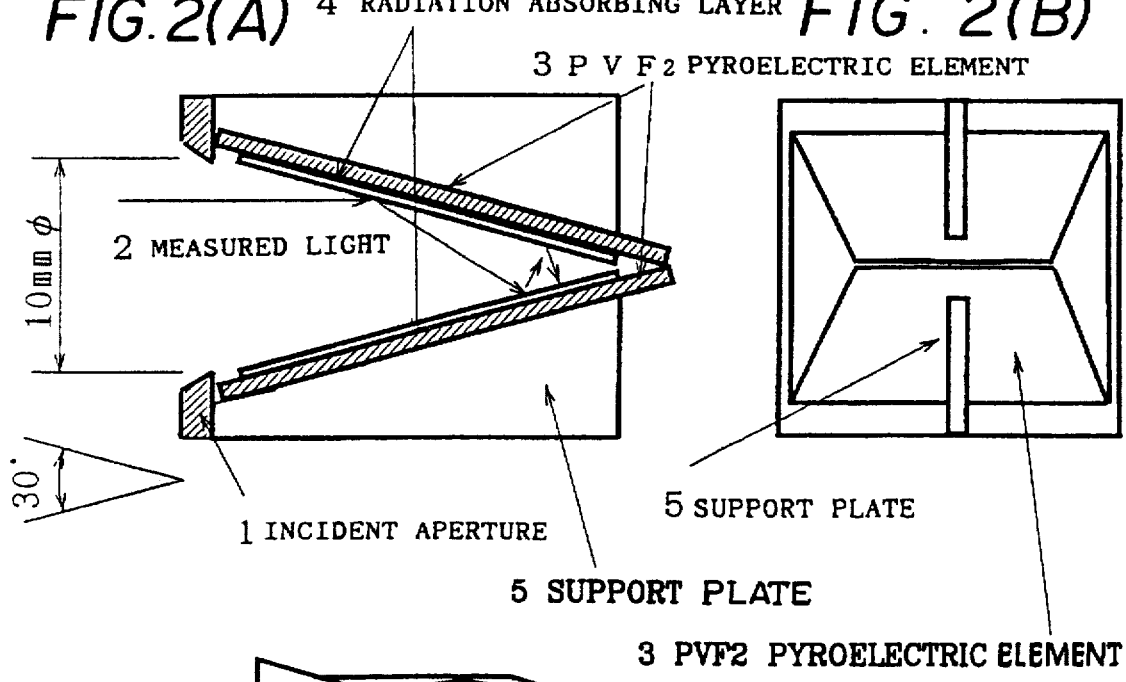
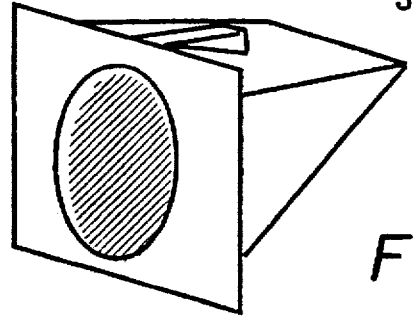
FIG. 2(A), FIG. 2(B), FIG. 2(C)

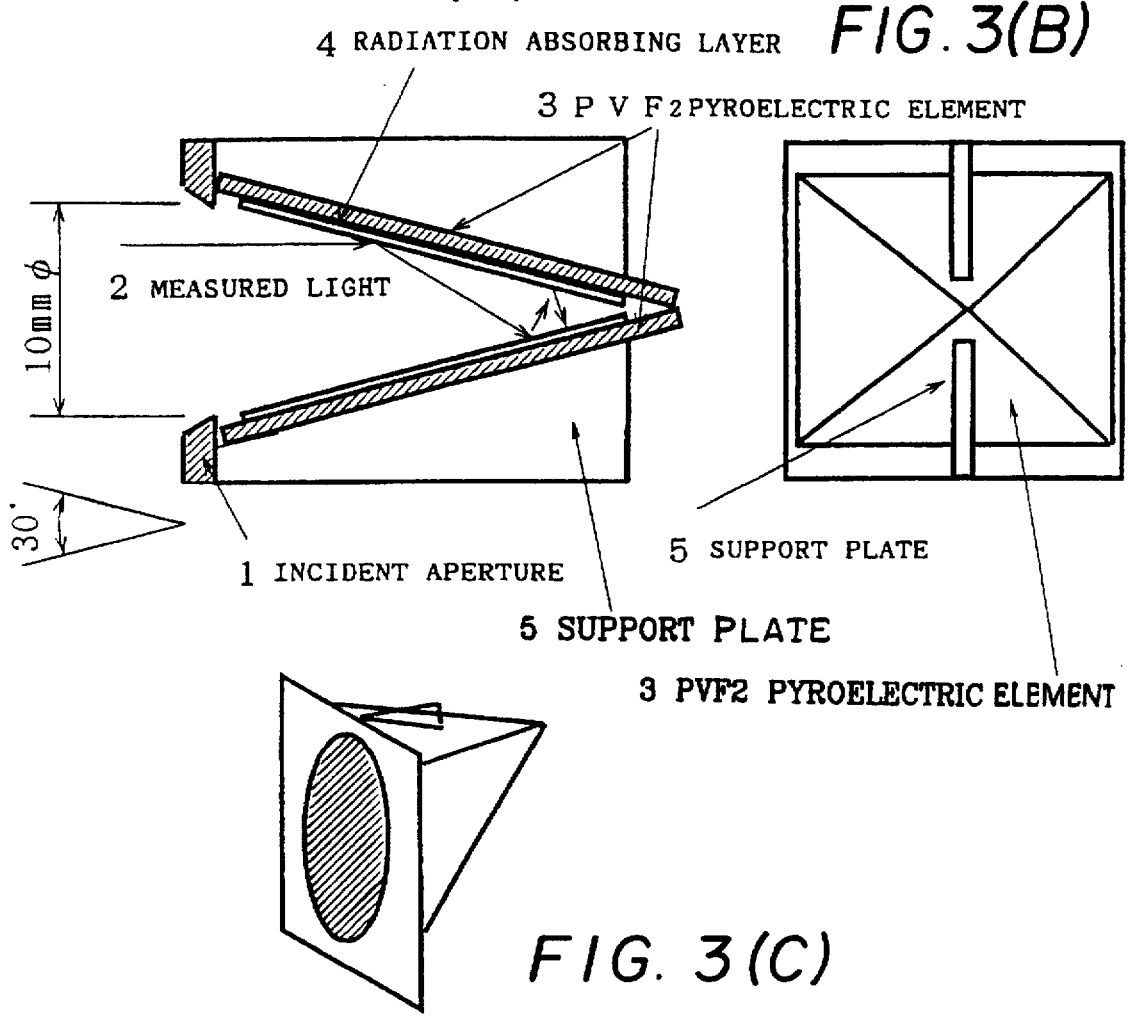

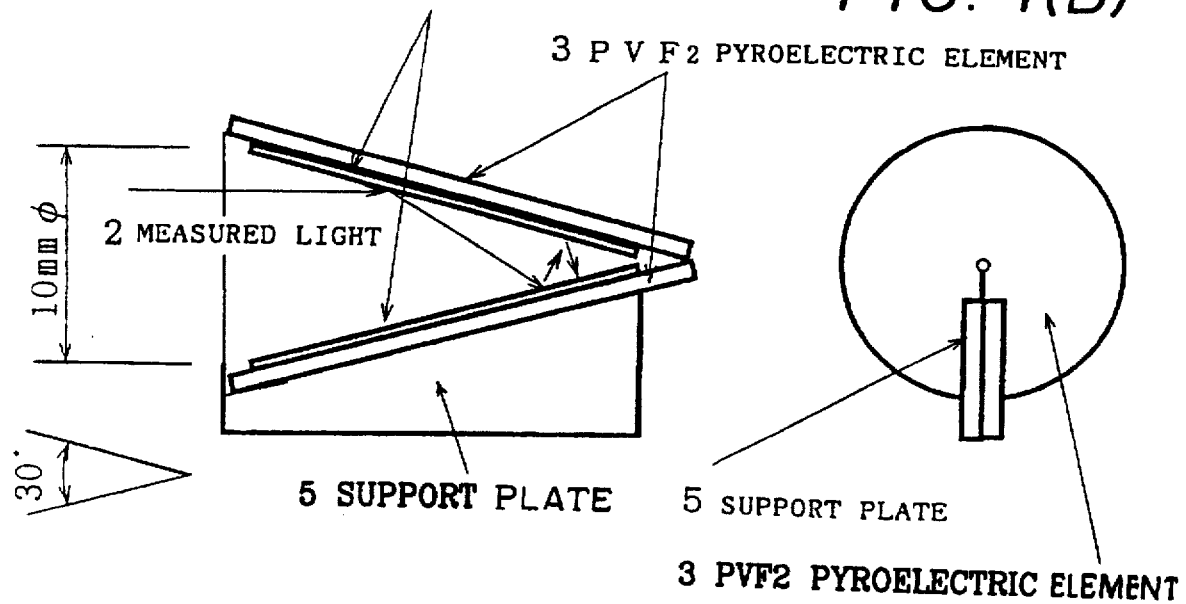

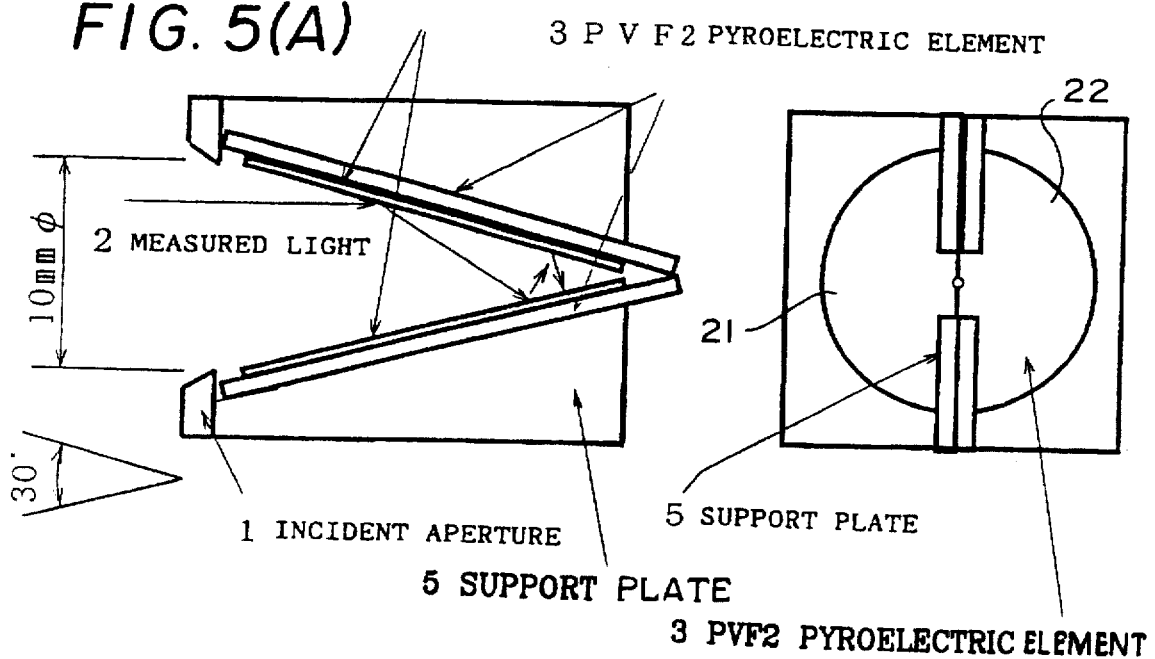

FIG. 18(A)
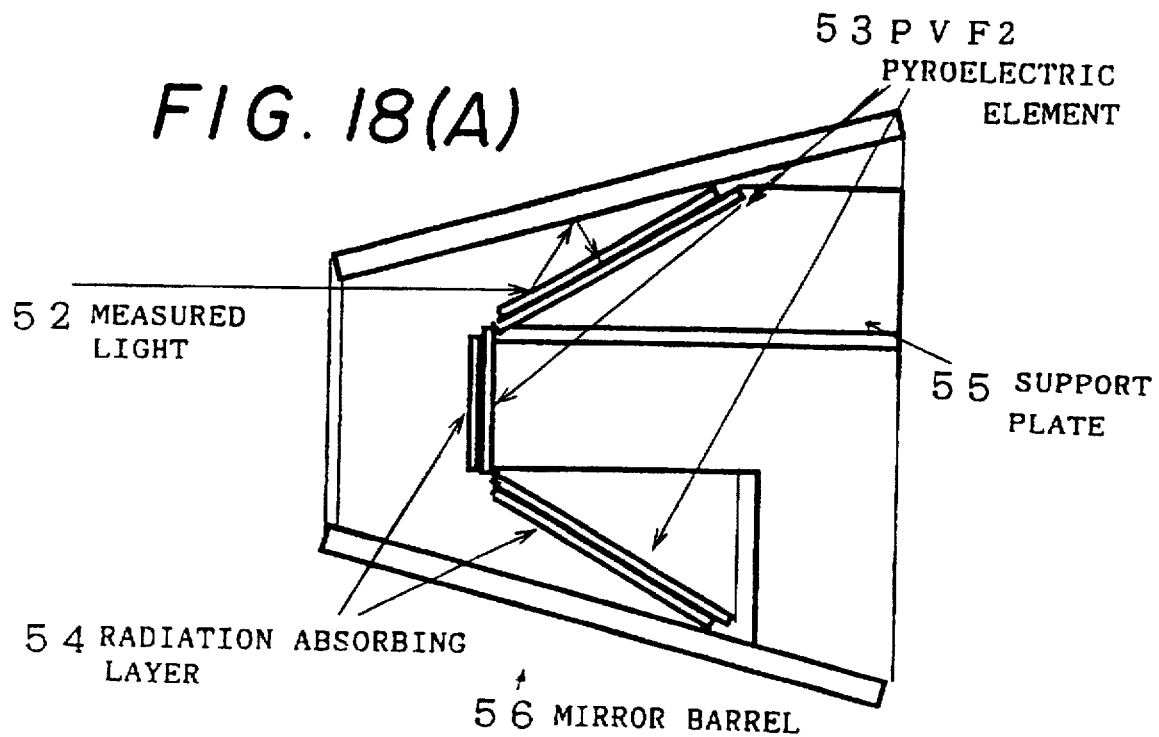
53 PVF2 PYROELECTRIC ELEMENT
52 MEASURED LIGHT
55 SUPPORT PLATE
54 RADIATION ABSORBING LAYER
56 MIRROR BARREL
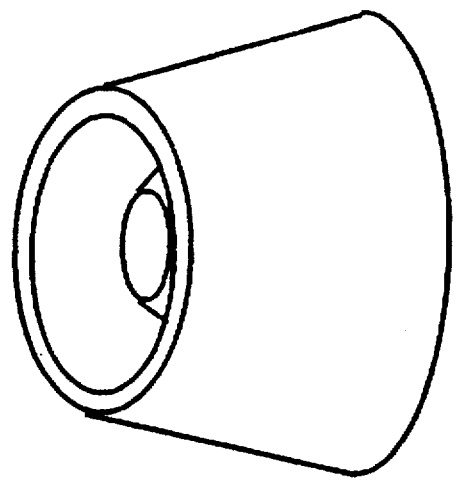
FIG. 18(B)

THERMAL RADIATION DETECTOR HAVING A SPECTRAL RESPONSIVITY NOT DEPENDENT ON WAVELENGTH

This application is a continuation of application Ser. No. 08/441,690, filed May 15, 1995, now abandoned, which application is entirely incorporated herein by reference.

BACKGROUND OF THE INVENTION

1. Field of Industrial Utility

The invention relates to a radiation detector which measures radiation energy.

2. Related Art of the Invention

Recently, industrial application of UV or IR radiation expands beyond the wavelength range of 250 nm to 2.5 µm. Particularly, in evaluation of characteristics of radiation of a discharge lamp or a laser in the UV or IR region, the extension of the wavelength range of the radiometry standard becomes a serious problem. Conventionally, as the irradiance standard, employed is a method in which a blackbody furnace is used, or an absolute radio meter which consists of a thermal detector. In a UV region of a wavelength of 250 nm or shorter, however, a blackbody furnace generates radiation energy of a very low level. Therefore, an absolute radio meter is employed in such a region.

A thermal detector comprises a thermal element such as a thermopile or a pyroelectric element which converts thermal energy into electrical energy, and a radiation absorbing layer which functions as a light receiving face and is made of a gold black deposition layer or a black coating composition. The radiation absorbing layer converts radiation energy into thermal energy, and the thermal element converts the thermal energy into electrical energy, thereby detecting the radiation energy. Consequently, the relative spectral responsivity of a thermal detector depends on the spectral absorption factor of the radiation absorbing layer to be used. In order to configure a thermal detector having a relative spectral responsivity which is free from the wavelength dependence, therefore, a radiation absorbing material having a relative spectral responsivity which is free from the wavelength is required dependency. In the prior art, for the sake of satisfying this requirement, gold black is used which is obtained by evaporating gold in an atmosphere of nitrogen. In order to eliminate the wavelength dependence of the spectral absorption factor, the thickness of the gold black layer must be increased.

However, the configuration of the prior art has a problem in that, when the gold black layer has a large thickness, the heat loss in the layer is large and hence the sensitivity is largely impaired. It is reported that a thermal detector using gold black has a spectral responsivity which is constant with respect to the wavelength in the visible wavelength region, but exhibits the wavelength dependence in the UV and IR regions so that a deviation of about 3% is observed at a wavelength of 250 nm (CIF Pub. No. 64: Determination of spectral responsivity of optical radiation detector).

In order to eliminate the wavelength dependence of a spectral responsivity, a cryogenic radiometer has been developed. The radiometer comprises a cavity which is formed by a metal such as copper, and the inside of which is blackened by a black coating composition. The metal cavity is cooled to 5 K by liquid helium, radiation is repeatedly reflected by the inner wall of the cavity to be absorbed, and the temperature rise of the cavity due to the absorbed energy is measured by a thermocouple which is disposed outside the cavity. However, the radiometer has large restrictions or problems in that a cryostat, a temperature control apparatus and the like for the cooling process have a large-scaled configuration, that the cavity which functions as a detecting unit is positioned at the innermost portion of the cryostat and hence light to be measured must be formed as a beam having a very small spread, and that the measurement must be conducted through a window for preventing dew condensation and hence the transmittance of the window must accurately be measured.

SUMMARY OF THE INVENTION

The present invention solves the above-discussed problems. It is an object of the invention to realize a radiation detector of a thermal type which can conduct the measurement at ordinary temperature, which has a spectral responsivity not depending on the wavelength, and which can obtain a stable output.

That is, a radiation detector of the present invention comprises a thermoelectric converting element which has an opening and a predetermined shape, and in which a radiation absorbing layer is attached to a part of or a whole of an inner face thereof, wherein said radiation absorbing layer absorbs light to be measured which enters through said opening of said thermoelectric converting element, in a form of heat, and said thermoelectric converting element converts a temperature rise into an electric signal, thereby detecting an energy amount of the radiation.

In a radiation detector according to above invention, said predetermined shape is a polyhedral shape.

In a radiation detector according to above invention, said polyhedral shape is a pyramidal shape.

In a radiation detector according to above invention, said predetermined shape is a conic shape.

A radiation detector of the present invention comprises a thermoelectric converting element which has a conic shape, a truncated conic shape, a pyramidal shape, or a truncated pyramidal shape, and in which a radiation absorbing layer is attached to a part of or a whole of an inner face thereof, wherein said radiation absorbing layer absorbs light to be measured which enters through an opening of a bottom face of said thermoelectric converting element in a form of heat, and said thermoelectric converting element converts a temperature rise into an electric signal, thereby detecting an energy amount of the radiation.

A radiation detector of the present invention comprises a thermoelectric converting device which has a conic shape, a truncated conic shape, a pyramidal shape, or a truncated pyramidal shape, said shape being formed by a predetermined number of thermoelectric converting elements, and in which a radiation absorbing layer is attached to an inner face thereof, wherein said thermoelectric converting elements are electrically connected in series so that polarities of electric generation are aligned in one direction, and said thermoelectric converting elements convert radiation of light to be measured which enters through an opening of a bottom face formed by said thermoelectric converting elements, into an electric signal, thereby detecting an energy amount of the radiation.

In a radiation detector according to above invention, said each thermoelectric converting element has a shape which is obtained by dividing a conic shape, a truncated conic shape, a pyramidal shape, or a truncated pyramidal shape in an axial direction, into portions of a predetermined number.

In a radiation detector according to above invention, said each thermoelectric converting element has a shape which is obtained by dividing a conic shape, a truncated conic shape, a pyramidal shape, or a truncated pyramidal shape in a diction perpendicular to an axial direction, into portions of a predetermined number.

A radiation detector of the present invention comprises one or a plurality of thermoelectric converting elements in each of which a radiation absorbing layer is attached to an inner face thereof, and one or a plurality of mirrors in each of which an inner face is a mirror face, wherein said radiation absorbing layer absorbs radiation of light to be measured which enters through an opening of a bottom face of a cone, a truncated cone, a pyramid, or a truncated pyramid formed by said thermoelectric converting element or elements and said mirror or mirrors, in a form of heat, and said thermoelectric converting element converts a temperature rise into an electric signal, thereby detecting an energy amount of the radiation.

In a radiation detector according to above invention, said each thermoelectric converting element or said each mirror has a shape which is obtained by dividing a conic shape, a truncated conic shape, a pyramidal shape, or a truncated pyramidal shape in an axial direction, into portions of a predetermined number.

In a radiation detector according to above invention, said each thermoelectric converting element or said each mirror have a shape which is obtained by dividing a conic shape, a truncated conic shape, a pyramidal shape, or a truncated pyramidal shape in a diction perpendicular to an axial direction, into portions of a predetermined number.

A radiation detector of the present invention comprises a thermoelectric converting element which has a conic shape, a truncated conic shape, a pyramidal shape, or a truncated pyramidal shape, and on which a radiation absorbing layer is attached to a part of or a whole of an outer face thereof;

a mirror barrel which houses said thermoelectric converting element, and in which a part of or a whole of an inner face thereof is a mirror face; and an incident aperture which is formed in an opening of said mirror barrel, wherein radiation which enters through said incident aperture enters into said radiation absorbing layer, a reflected radiation component is reflected from said mirror barrel and said incident aperture to again enter said radiation absorbing layer, said radiation absorbing layer absorbs the entering radiation in a form of heat as a result of repeating the entering and reflecting processes, and said thermoelectric converting element converts a temperature rise into an electric signal, thereby detecting an energy amount of the radiation.

A radiation detector of the present invention comprises a first thermoelectric converting element which has a conic shape, a truncated conic shape, a pyramidal shape, or a truncated pyramidal shape, and in which a radiation absorbing layer is attached to a part of or a whole of an outer face thereof;

a second tubular thermoelectric converting element which houses said first thermoelectric converting element, and in which a radiation absorbing layer is attached to a part of or a whole of an inner face thereof; and an incident aperture which is formed in an opening of said second thermoelectric converting element, wherein radiation which enters through said incident aperture enters into said radiation absorbing layer, a reflected radiation component is reflected from said second thermoelectric converting element and said incident aperture to again enter said radiation absorbing layer, said radiation absorbing layer absorbs the entering radiation in a form of heat as a result of repeating the entering and reflecting processes, and said thermoelectric converting elements convert a temperature rise into an electric signal, thereby detecting an energy amount of the radiation.

In a radiation detector according to above invention, said incident aperture is eliminated.

In a radiation detector according to above invention, said incident aperture is eliminated.

In a radiation detector according to above invention, said mirror barrel has a truncated conic shape, or a truncated pyramidal shape, and a portion of said mirror barrel in a side of said opening has a tapered shape.

In a radiation detector according to above invention, said second tubular thermoelectric converting element has a truncated conic shape, or a truncated pyramidal shape, and a portion of said element in a side of said opening has a tapered shape.

According to the invention, the above-mentioned configuration allows radiation of light to be measured which enters through the opening of the bottom face of a conic portion, to be repeatedly reflected and absorbed by the radiation absorbing layer of the inner surface of the conic portion in a form of heat, and the temperature rise is converted into an electric signal by the pyroelectric element which forms the conic portion so that the energy amount of the radiation is effectively detected.

According to the invention, the conic portion is formed by a plurality of pyroelectric elements, and these elements are electrically connected in series in a manner that the directions of these polarizations of these elements is same, thereby decreasing the capacity of the detector to improve the sensitivity of the detector.

According to the invention, the detector is formed by a semiconic mirror and a semiconic pyroelectric element and all radiation which entered into the mirror is entered into the radiation absorbing layer formed on the inner surface of the pyroelectric element and therefore the radiation entering the unit area of the radiation absorbing layer which functions as a light receiving face is doubled. Consequently, it is possible to realize a radiation detector having an S/N ratio which is twice that of the radiation detector which is formed by the conic pyroelectric element as mentioned above.

BRIEF DESCRIPTION OF THE DRAWINGS

FIG. 1(A) is a longitudinal section view showing the configuration of a radiation detector of an embodiment of the invention.

FIG. 1(B) is a rear view showing the configuration of the radiation detector.

FIG. 1(C) is a perspective view showing the configuration of the radiation detector.

FIG. 2(A) is a longitudinal section view showing the configuration of a radiation detector of an embodiment of the invention.

FIG. 2(B) is a rear view showing the configuration of the radiation detector.

FIG. 2(C) is a perspective view showing the configuration of the radiation detector.

FIG. 3(A) is a longitudinal section view showing the configuration of a radiation detector of an embodiment of the invention.

FIG. 3(B) is a rear view showing the configuration of the radiation detector.

FIG. 3(C) is a perspective view showing the configuration of the radiation detector.

FIG. 4(A) is a longitudinal section view showing the configuration of a radiation detector of an embodiment of the invention.

FIG. 4(B) is a rear view showing the configuration of the radiation detector.

FIG. 4(C) is a perspective view showing the configuration of the radiation detector.

FIG. 5(A) is a longitudinal section view showing the configuration of a radiation detector of an embodiment of the invention.

FIG. 5(B) is a rear view showing the configuration of the radiation detector.

FIG. 6 is a diagram of the electrical connection of the radiation detector of the embodiment of the FIG. 5.

FIG. 18(A) is a longitudinal section view showing the configuration of a radiation detector of an embodiment of the invention.

FIG. 18(B) is a perspective view showing the configuration of the radiation detector.

Figure 7A:
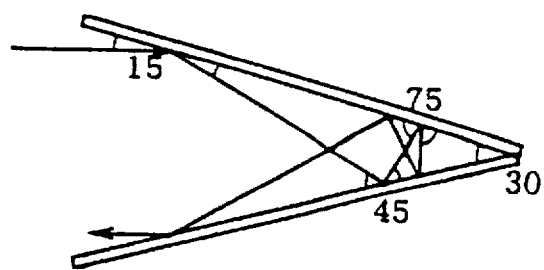
FIG. 7 is a view showing the internal reflection model having various apex angles in an embodiment of the present invention.
Figure 7B:
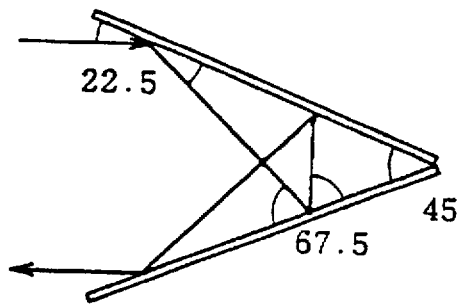
Figure 7C:
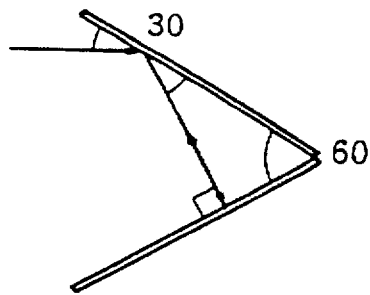
Figure 7D:
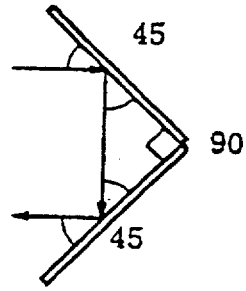

LEGEND OF REFERENCE NUMERALS 1,51 incident aperture
2,52 radiation
3,53 pyroelectric element
4,54 radiation absorbing layer
5,43,44,55 support plate
6 preamplifier
21 first pyroelectric element
22 second pyroelectric element
41 semiconic pyroelectric element
semiconic mirror
56 mirror barrel

PREFERRED EMBODIMENTS

Hereinafter, an embodiment of the invention will be described with reference to the drawings. FIG. 1 is a view showing the configuration of an embodiment of the invention. FIG. 1(A) is a longitudinal section view. FIG. 1(B) is a rear view from the back side of the FIG. 1(A), and FIG. 1(C) is a perspective view.

In the figure, radiation 2 which enters through an incident aperture 1 in which an opening has a diameter $\phi1$ of about 10 mm enters a radiation absorbing layer 4 made of gold black and deposited on the inner face of a pyroelectric element 3 which has a conic shape and is made of $PVF_2$ (polyvinylidene fluoride). The apex angle $\theta1$ of the conic shape is 30°. A portion of the light is absorbed, and the remaining portion of the light is reflected to again enter the gold black radiation absorbing layer 4. This process is repeated so that the radiation 2 is fully absorbed by the gold black radiation absorbing layer 4.

When the spectral reflectance of the radiation absorbing layer is indicated by $\gamma(\lambda)$ and when the repetition of the number of reflections and absorptions of the radiation in the cone which enters in a direction perpendicular to the opening of the cone is indicated by n, the effective absorption factor $\alpha(\lambda)$ is given by the following expression:

$$\alpha(\lambda)=1-\gamma(\lambda)^n \qquad \text{Equation 1}$$

When the gold black radiation absorbing layer 4 having a spectral reflectance $\gamma(\lambda)<0.1$ is applied to the inside of a cone having a apex angle $\theta1$ of 30°, and N=6, $\alpha(\lambda)$ <0.9999999 or the effective absorption factor α(λ) is 99.99999%. In other words, the wavelength dependence of the responsivity is eliminated. FIG. 7 shows such operation.

The pyroelectric element 3 has electrodes which are formed by depositing aluminum on both faces of a film having a thickness of 9 µm, and is flexible. The pyroelectric element 3 is fixed by support plates 5 so as to have a conic shape. The support plates 5 are fixed to the incident aperture 1. Specifically, the pyroelectric element 3 is first cut into a fan shape. The support plates 5, made of an electrical and thermal insulating resin or ceramics which is excellent in electrical and thermal insulating properties, are adhered to both ends of the fan shape from the pivot to the peripheral portion, respectively. The radiation absorbing layer 4 is formed by evaporating gold in an atmosphere of a nitrogen gas pressure of 1 to 2 torr while making the pyroelectric element 3 flat. When a film of gold black is formed so as to have a thickness of about 10 µm, it is possible to obtain a radiation absorbing layer 4 that has an excellent heat conductivity. In the embodiment, gold black was attached as the radiation absorbing layer 4 to the surface of the pyroelectric element 3. Alternatively, metal black formed by evaporating another metal may be attached, or a black coating composition may be attached.

After the gold black is formed as described above, the support plates 5 at the both ends of the pyroelectric element 3 were bonded to each other so that a cone is formed with the radiation absorbing layer 4 positioned inside the cone. Ends of the support plates 5 of the pyroelectric element formed into a conic shape are fixed to the incident aperture 1, thereby constituting the radiation detector shown in FIG. 1. The reference numeral 15 designates an auxiliary support plate which cooperates with the support plates 5 and supplementally fixes the pyroelectric element 3 to the incident aperture 1. The electrodes of the pyroelectric element 3 are not shown in the figure.

The measurement of radiation is conducted in the following manner. The radiation 2 modulated by an optical chopper or the like enters the radiation detector through the incident aperture 1. An electric output of the pyroelectric element 3 due to the light is detected in synchronization with the modulation frequency by a lock-in amplifier (not shown) having a high input impedance.

The lock-in amplifier can attain a sensitivity of 1 µV/ (µW/cm²) or higher when the input impedance is 10 MΩ and the modulation frequency is 18.5 Hz. The sensitivity of the pyroelectric element is inversely proportional to the modulation frequency. When the modulation frequency is lowered to about 2 Hz, therefore, it is possible to obtain a radiation detector having a high sensitivity which is about 20 times that of a conventional thermal type (thermopile) radiation detector having the same opening area and light receiving area as incident aperture 1. The radiation absorbing layer 4 repeatedly captures reflected radiation components of the radiation 2. Therefore, the wavelength dependence on sensitivity is eliminated.

As described above, according to the embodiment, a radiation detector of a thermal type can be realized in which the pyroelectric element to be used has a film-like shape and hence the radiation detector can easily be produced, and which can conduct the measurement at ordinary temperature, has a spectral responsivity not depending on the wavelength, and can obtain a stable output.

Further the radiation detector of FIG. 2 is an embodiment of the present invention where the pyroelectric element 3 has the shape of a triangular prism. FIGS. 2(A) is a longitudinal section view. FIG. 2(B) is a rear view illustrating the back side of FIG. 2(A), and FIG. 2(C) is a perspective view. By using such a polyhedral shape, the radiation absorbing layer 4 repeatedly captures reflected radiation components of the radiation 2. Therefore, the wavelength dependence of the sensitivity is eliminated.

Further the radiation detector of FIG. 3 is an embodiment of the present invention where the pyroelectric element 3 has the shape of a four sided pyramidal shape. FIG. 3(A) is a longitudinal section view. FIG. 3(B) is a rear view illustrating the back side of the FIG. 3(A), and FIG. 3(C) is a perspective view. By using such a pyramidal shape, the radiation absorbing layer 4 repeatedly captures reflected radiation components of the radiation 2. Therefore, the wavelength dependence of the sensitivity is eliminated.

Further the radiation detector of FIG. 4 is an embodiment of the present invention where the aperture from the detector of FIG. 1 is eliminated. FIG. 4 is a longitudinal section view. FIG. 4(B) is a rear view from the back side of FIG. 4(A), and FIG. 4(C) is a perspective view. By using such a detector having no aperture, the radiation absorbing layer 4 repeatedly captures reflected radiation components of the radiation 2. Therefore, the wavelength dependence of the sensitivity is eliminated.

Hereinafter, an other embodiment of the invention will be described with reference to this drawings. In the embodiment of the invention, the cone structure of the embodiment of FIG. 1 is configured using two pyroelectric elements. The pyroelectric elements are electrically connected in series so that the polarities of pyroelectric polarization are aligned in one direction, thereby reducing the electric time constant.

FIG. 5 is a view showing this configuration. FIG. 5(A) is a section view, and FIG. 5(B) is a rear view. FIG. 6 is a diagram of the electrical connection of the two pyroelectric elements 3.3.

In FIG. 5, 21 designates a first pyroelectric element which has a film-like shape. Support plates 23 made of a plate-like electrical and thermal insulating resin are adhered to both ends of the pyroelectric fan-shaped element from the pivot to the peripheral portion. Furthermore, 22 designates a second pyroelectric element which has a film-like shape. Similarly, support plates 24 are adhered to the both ends of this pyroelectric fan shaped element 22 also. In the same manner as the embodiment of FIG. 1, a black coating composition or gold black is attached as a radiation absorbing layer 4 to one face of each of the first and second pyroelectric elements 21 and 22.

The support plates 23 and 24 fixed to the ends of the first and second pyroelectric elements 21 and 22 are adhered to each other so that the radiation absorbing layer 4 is positioned inside, and the first and second pyroelectric elements 21 and 22 are bent and then attached to each other in the form of a conic shape. As shown in FIG. 6, the first and second pyroelectric elements 21 and 22 are connected in series by wires so that the polarities of pyroelectric polarization are aligned in one direction, thereby forming a configuration in which radiation 2 entering through the bottom opening of the cone, formed by the first and second pyroelectric elements 21 and 22, is converted into an electric signal and the energy amount of the radiation is detected. In FIG. 6, the arrangement of the pyroelectric elements 21 and 22 is shown in a deformed manner for easier understanding of the description.

The operation of the thus configured embodiment will be described. Because the pyroelectric element responds to a differential amount, namely, a variation of temparature of the element, the pyroelectric element detects the light which is modulated by a chopper or the like. When the modulation frequency is indicated by ω, R indicates a combined resistance of the internal resistances of the pyroelectric elements and an input resistance of a preamplifier 6 for connecting the elements, C indicates a combined capacitance of the internal capacitances of the pyroelectric elements and an input capacitance of the preamplifier 6 for connecting the elements, S indicates the area of the opening of the cone, S' indicates the area of the light receiving element or the internal area of the cone, P indicates the pyroelectric coefficient of the pyroelectric elements, G indicates the thermal conductance of the elements with respect to the surrounding, H indicates the thermal capacitance of the pyroelectric elements, the thermal time constant of the elements is indicated by $\tau_T$ (=H/G), and the electrical time constant of the elements is indicated by $\tau_E$ (=CR), the responsivity of the pyroelectric elements can be expressed by the following expression:

$$R_V = \eta \omega RSS'P/G \cdot (1+\omega^2\tau_T^2)^{-\frac{1}{2}}(1+\omega^2\tau_E^2)^{-\frac{1}{2}} \quad \text{Expression 2}$$

When $\omega > 1/\tau_E$, therefore, the sensitivity $R_V$ of the pyroelectric elements is larger as the frequency is higher. When $1/\tau_E > \omega > 1/\tau_T$, the sensitivity of the pyroelectric elements is constant irrespective of the frequency. When $1/\tau_T > \omega$, the sensitivity of the pyroelectric elements is increased in proportion to the reduction of the frequency. As compared with the radiation detector set forth in claim 1, therefore, the radiation detector set forth in claim 2 has a wider frequency region in which the sensitivity does not depend on the modulation frequency of incident light, and hence can configure a detector which is stable or not affected by the variation of the modulation frequency.

When input radiation is modulated at 18.5 Hz and radiation detection is conducted by using an amplifier having an input impedance $R = 10^8\ \Omega$, the thermal time constant $\tau_T$ of the elements is 1 sec. or longer, and the electrical time constant $\tau_E$ is 15 msec. or longer. In this case, $\omega > 1/\tau_T$ and $1/\tau_E$, and therefore the following relationship holds:

$$R_V = \eta SP/\omega C_V dC \quad \text{Expression 3}$$

where $C_V$ is the volume specific heat of the elements and d is the thickness of the elements, and the following holds:

$$\tau_T = C_V S' \cdot d \cdot G \quad \text{Expression 4}$$

From the above, it will be seen that, when the diameter φ1 of the opening is set to be constant or 10 mm or in other words the opening area S' is constant, the sensitivity of the detector is inversely proportional to the capacity C of the elements.

Actually, the sensitivity of the detector was measured as shown in Table 1 while the element area or the element capacitance was varied by changing the apex angle (opening angle) while keeping the opening area constant, as listed in the table below. In the detector having a apex angle of 90°, the repetition number of reflections and absorptions is 2. Therefore, this apex angle is the limit of attaining the repeated reflection and absorption effect. In the case where the opening area is constant, the detector having a apex angle of 90° shows the smallest element capacitance and attains the highest sensitivity.

TABLE 1

SHAPE AND SIZE OF A CONIC RADIATION DETECTOR OF A THERMAL TYPE (DESIGNED VALUE)

| | VERTICAL ANGLE OF 30° C. | VERTICAL ANGLE OF 45° C. | VERTICAL ANGLE OF 60° C. | VERTICAL ANGLE OF 90° C. | FLAT TYPE |
|---|---|---|---|---|---|
| LENGTH OF OBLIQUE LINE | 19 mm | 13 mm | 10 mm | 7 mm | — |
| DEPOSIT AREA OF GOLD BLACK | 299 mm² | 204 mm² | 157 mm² | 109 mm² | 79 mm² (10 mm φ) |
| ELECTRODE AREA OF PYROELECTRIC ELEMENT | 320 mm² | 236 mm² | 190 mm² | 143 mm² | 113 mm² (12 mm φ) |
| CAPACITANCE Cp OF PYROELECTRIC ELEMENT | 3510 pF | 2590 pF | 2085 pF | 1570 pF | 1240 pF |
| REPETITION NUMBER OF REFLECTION | 6 | 4 | 3 | 2 | 1 |

(INCIDENT OPENING AREA 10 MM φ)

FIG. 7 shows the internal reflection model of a conic shape having various apex angles.

Figure 8:
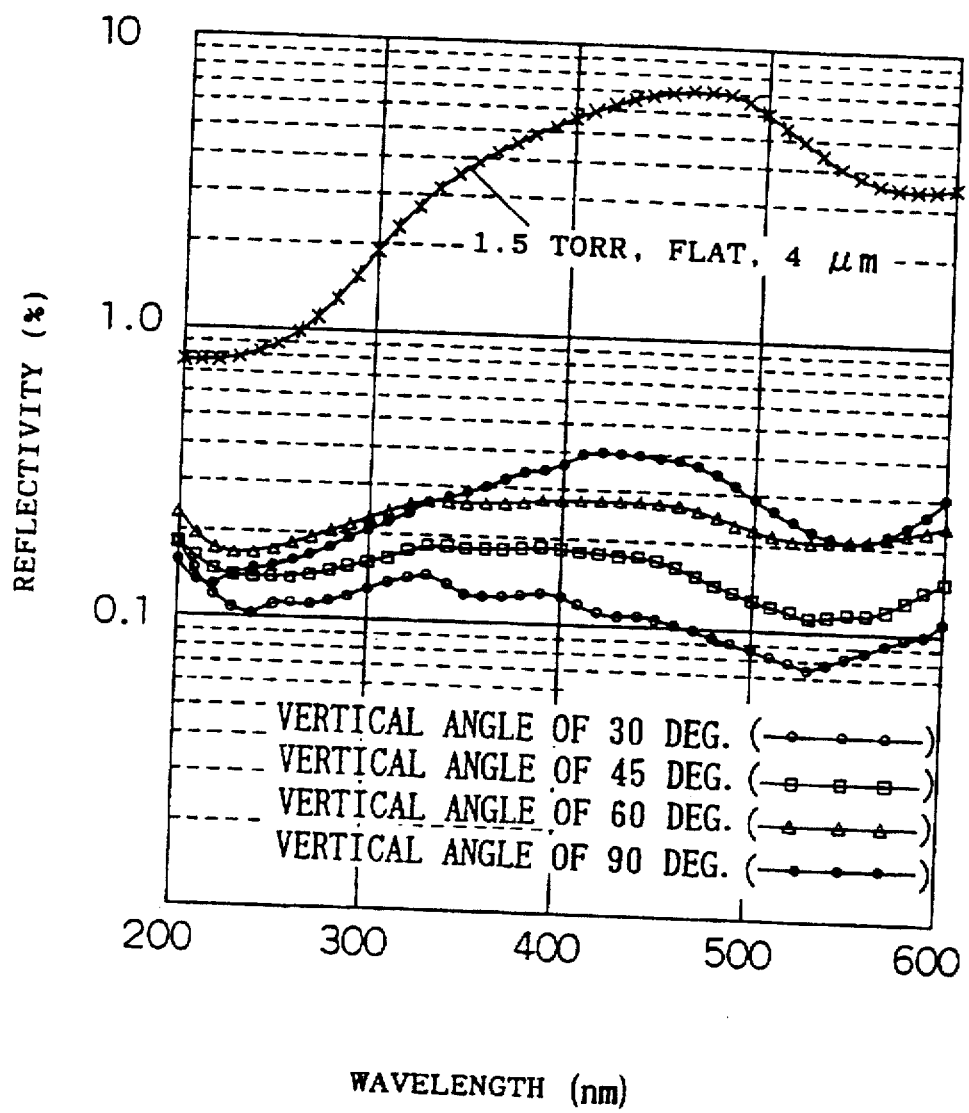
FIG. 8 is a graph showing the relation between the wavelength and the reflectance in an embodiment of the present invention.

In order to check the repeated reflection and absorption effect in a cone, detectors in which gold black of a thickness of 4 μm was deposited in an atmosphere of a nitrogen gas pressure of 1.5 torr were produced and the effective reflectance was measured while changing the apex angle. As shown in FIG. 8, even in the detector having a apex angle of 90°, in which the repetition number of reflections and absorptions is 2, the reflectance is improved to 0.7% or less while the reflectance of the detector of flat gold black was 8% or less. In other words, radiation can be absorbed with 99.4% or more.

Figure 9:
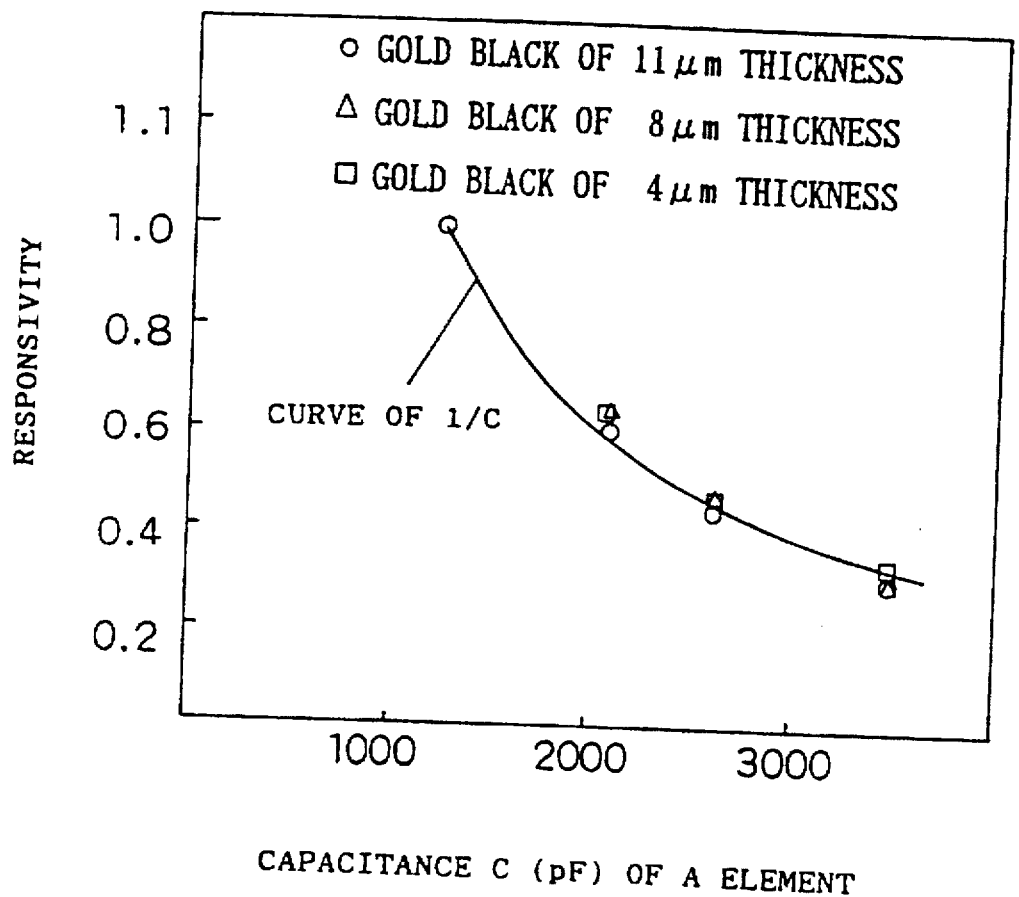
FIG. 9 is a graph showing the relation between the wavelength and the reflectance in an embodiment of the present invention.

FIG. 9 shows sensitivities which were measured while the element area or the element capacitance was varied by changing the apex angle (opening angle) while the opening area remained constant.

As seen from the above, the radiation detector of the embodiment has a capacitance which is one-half that of the radiation detector of the embodiment of FIG. 1, and therefore the sensitivity is improved to be doubled.

Figures 10A, 10B:
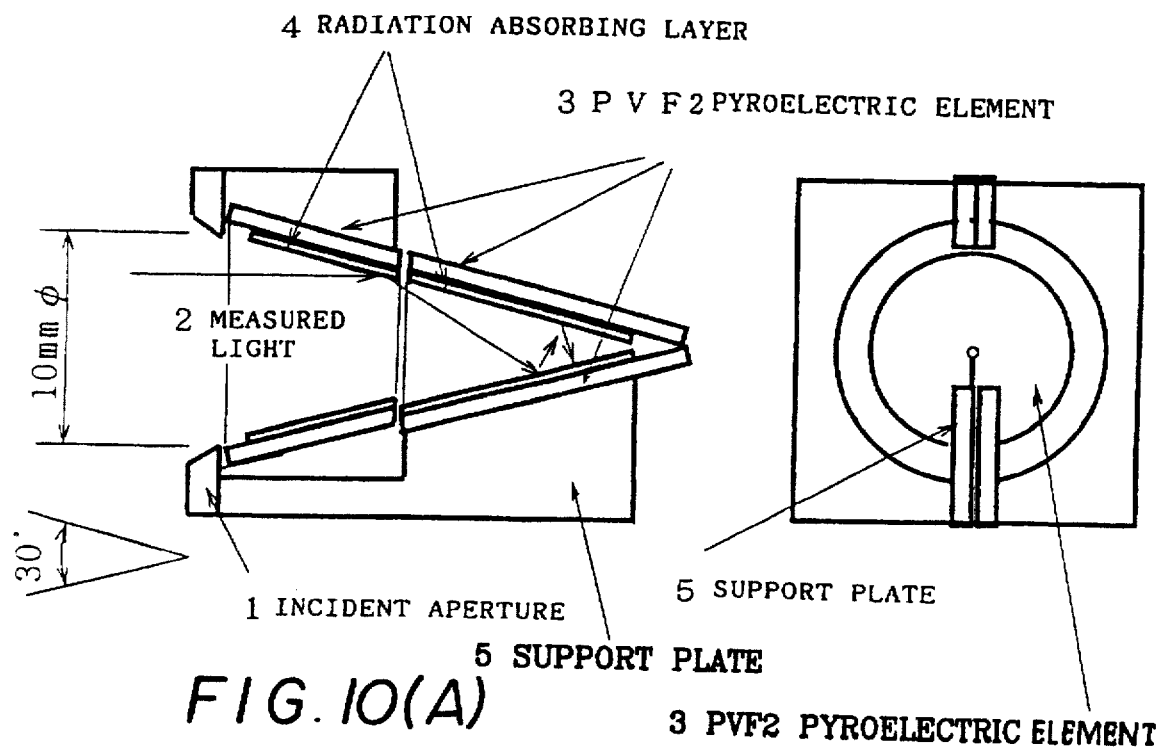
FIG. 10(A) is a longitudinal section view showing the configuration of a radiation detector of an embodiment of the invention.
FIG. 10(B) is a rear view showing the configuration of the radiation detector.

Further the radiation detector of FIG. 10 is an embodiment of the present invention where the pyroelectric element 3 has a shape which is obtained by dividing a conic shape, in a direction perpendicular to an axial direction, into two portions. FIG. 10(A) is a longitudinal section view, and FIG. 10(B) is a rear view from the back side of FIG. 10(A). The shapes can be other shape such as a truncated conic shape, a pyramidal shape, or a truncated pyramidal shape. And the number of the divisions is not limited to two, that is, it can be three or more.

Figures 11A, 11B:
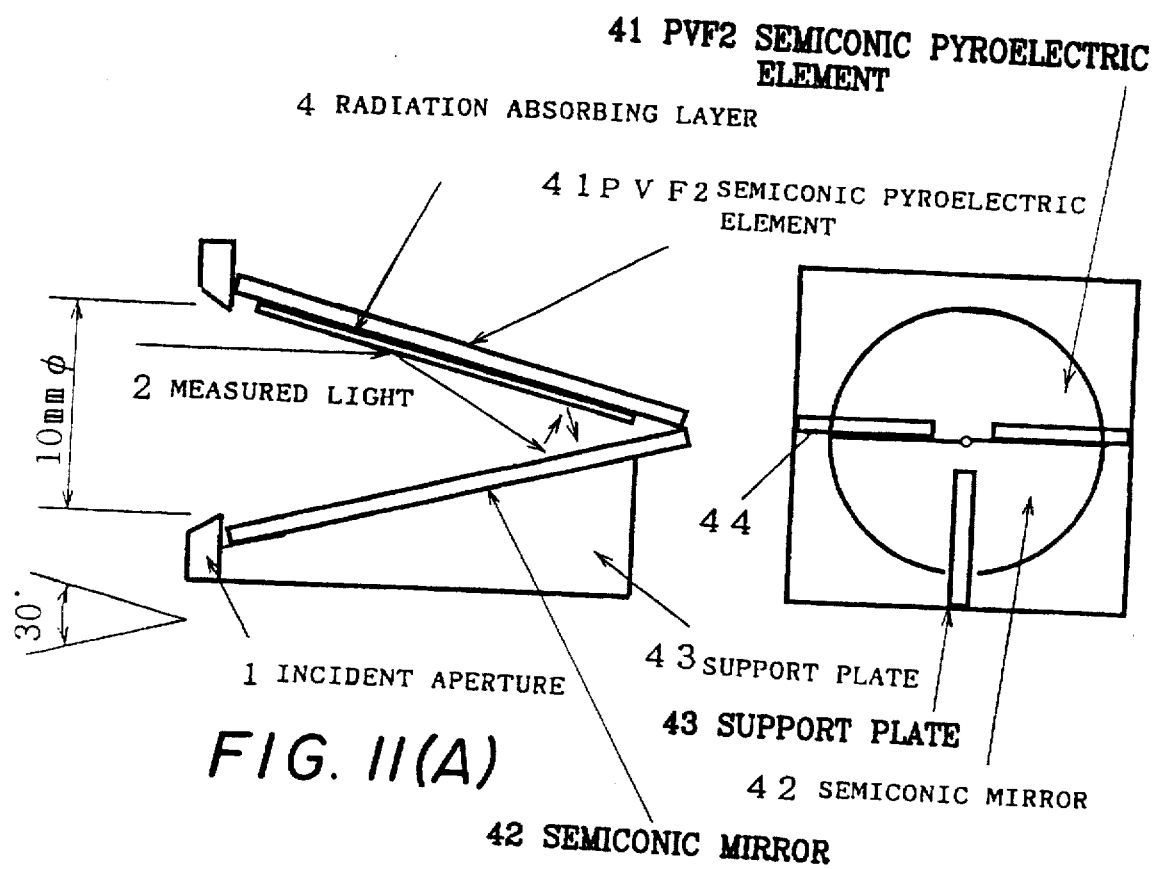
FIG. 11(A) is a section view showing the configuration of a radiation detector of another embodiment of the invention.
FIG. 11(B) is a rear view showing the configuration of the radiation detector.

Hereinafter, another embodiment of the invention will be described with reference to the drawings of FIG. 11. In this embodiment of the invention, the cone structure of the embodiment of FIG. 1 is configured by a semiconic pyroelectric element to which a radiation absorbing layer is applied, and a semiconic mirror which has the same shape as the element, so that light entering the semiconic mirror is reflected toward the semiconic pyroelectric element, thereby detecting radiation. FIG. 11(A) is a longitudinal section view, and FIG. 11(B) is a rear view from the back side of FIG. 11(A).

As shown in FIG. 11, 41 designates a semiconic pyroelectric element in which a radiation absorbing layer is attached to the inner face in the same manner as the embodiment of FIG. 2, and 42 designates a semiconic mirror in which the inner face is a mirror face. The semiconic mirror 42 may have any configuration as long as the inner face can reflect light. The reference numerals 43 and 44 designate support plates respectively fixed to the ends of the semiconic pyroelectric element 41 and the semiconic mirror 42. The support plates 43 and 44 are adhered to each other so that the radiation absorbing layer is positioned inside and the semiconic pyroelectric element 41 and the semiconic mirror 42 form a conic shape. The ends of the support plates are fixed to the incident aperture 1, thereby constituting the radiation detector.

The operation of the thus configured embodiment will be described. Among the radiation which enters the opening of the bottom face of the cone formed by the semiconic pyroelectric element 41 and the semiconic mirror 42, light directly entering the radiation absorbing layer is absorbed as it is by the radiation absorbing layer in the form of heat, and light entering the semiconic mirror 42 is reflected therefrom to indirectly enter the radiation absorbing layer. The result is that the radiation absorbing layer absorbs the direct light and the indirect light and the pyroelectric element converts the temperature rise into an electric signal, thereby detecting the energy amount of the radiation.

As seen from the above, according to this embodiment, the radiation entering the unit area of the radiation absorbing layer which functions as a light receiving face is doubled, and hence it is possible to realize a radiation detector having an S/N ratio which is twice that of the radiation detector of the embodiment of FIG. 1.

Figures 12A, 12B:
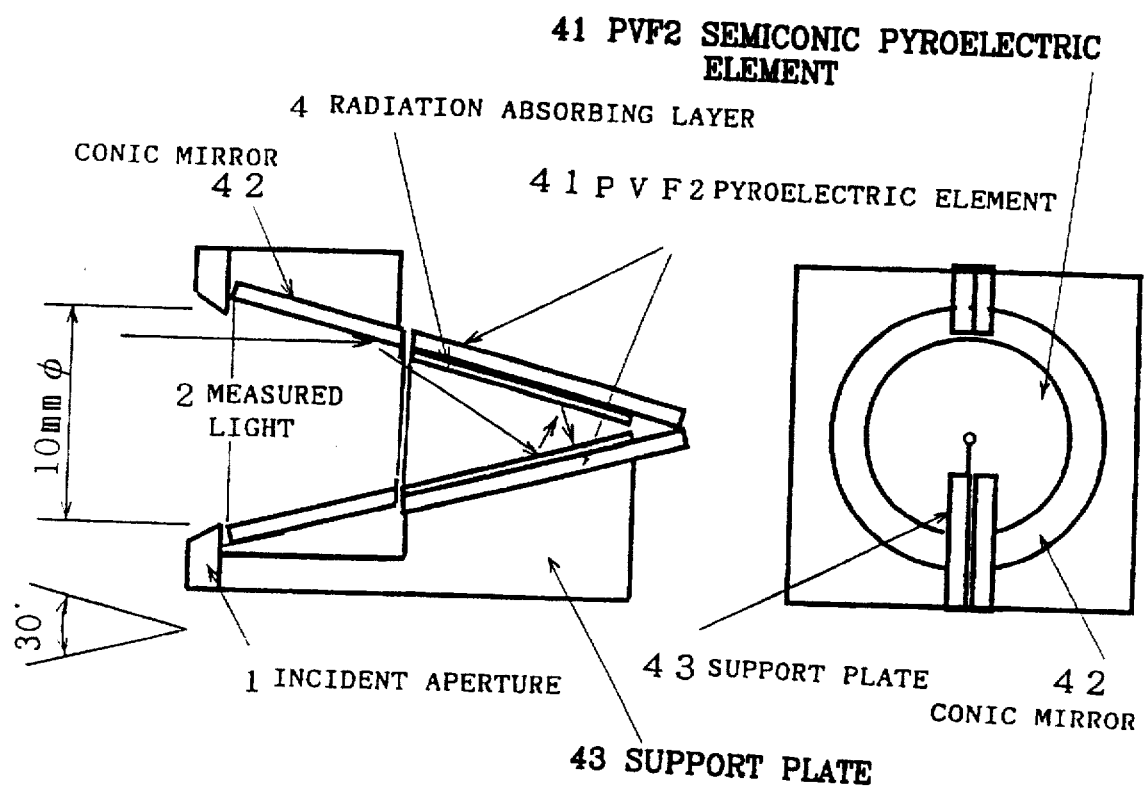
FIG. 12(A) is a longitudinal section view showing the configuration of a radiation detector of an embodiment of the invention.
FIG. 12(B) is a rear view showing the configuration of the radiation detector.

In the embodiment, the semiconic pyroelectric element 41 and the semiconic mirror 42 are formed so as to be a semiconic shape which is obtained by dividing a cone in the axial direction into two laterally-separated portions. Alternatively, a cone may be divided in a direction perpendicular to the axial direction into front and rear portions as shown in FIGS. 12(A) and 12(B). In this alternative, the portion which is closer to the incident aperture 1 may be formed as the mirror portion, and the remaining portion as the pyroelectric element in which a radiation absorbing layer is attached to the inner face. According to the alternative, radiation is converged by the mirror to the radiation absorbing layer.

Hereinafter, another embodiment of the invention will be described with reference to the drawings of FIGS. 13(A) and (B).

Figure 13A:
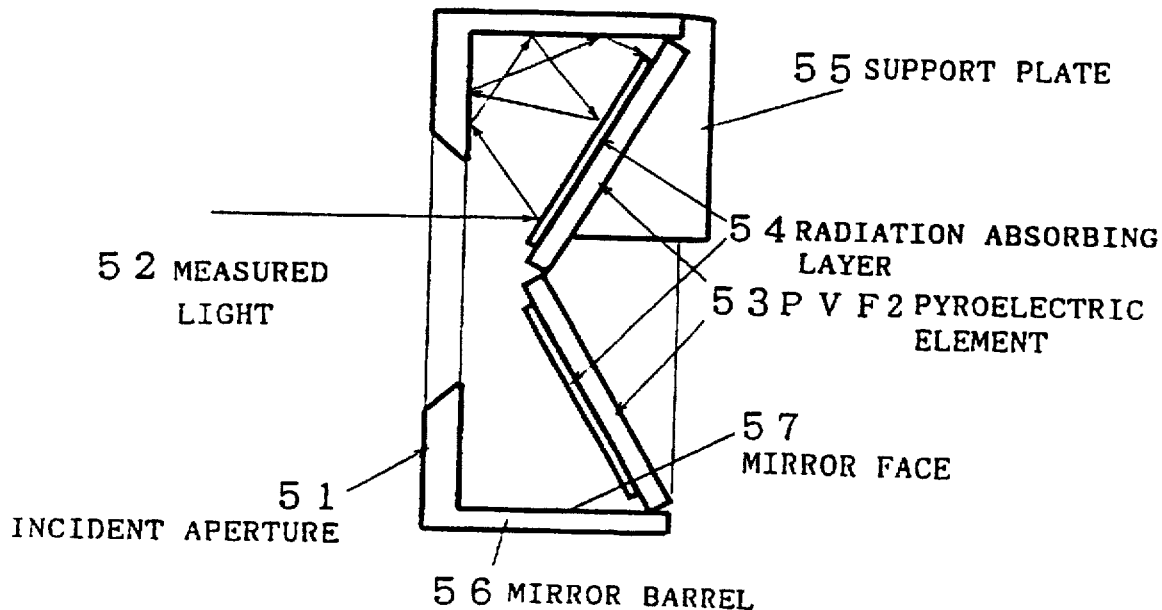
FIG. 13(A) is a longitudinal section view showing the configuration of a radiation detector of an embodiment of the invention.
Figure 13B:
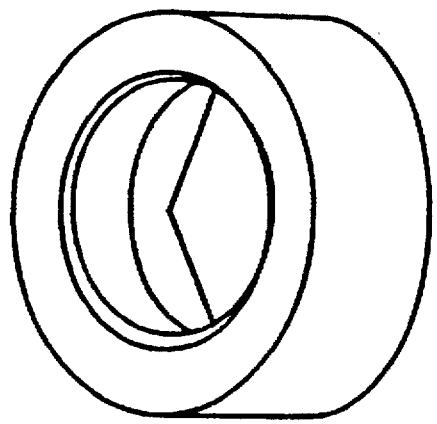
FIG. 13(B) is a rear view showing the configuration of the radiation detector.

In FIGS. 13(A) and 13(B), 51 designates an incident aperture, 52 designates radiation, 53 designates a conic pyroelectric element in which a black coating composition or gold black is attached as a radiation absorbing layer 54 on one face, and 55 designates two support plates which are made of an electrical and thermal insulating resin and respectively adhered to the both ends of the film-like pyroelectric fan shaped element from the pivot of the fan shape to the peripheral portion. The support plates 55 are adhered to each other so that the radiation absorbing layer 54 is positioned on the outside, and the pyroelectric element 53 forms a conic shape. The reference numeral 56 designates a mirror barrel which is disposed so as to cover the conic structure of the pyroelectric element, and 57 designates a mirror face which is formed on a face of the incident aperture 51 in the side of the mirror barrel 56. The incident aperture 51 is disposed at a position opposed to the pyroelectric element 53 across the mirror barrel 56. Radiation entering through the incident aperture 51 is incident on the radiation absorbing layer 54, and a radiation component reflected therefrom is reflected from the mirror barrel 56 and the mirror face 57 of the incident aperture 51 to again enter the radiation absorbing layer 54. This process is repeated so that all of the incident radiation 52 is absorbed by the radiation absorbing layer 54 in the form of heat. The temperature rise is converted by the pyroelectric element 53 into an electric signal, thereby detecting the energy amount of the radiation.

In other words, the configuration of this embodiment is characterized as follows: the configuration of the embodiment of FIG. 1 is modified so that the radiation absorbing layer 4 is positioned outside the cone formed by the pyroelectric element 3, that the mirror barrel and the incident aperture 51 are disposed so as to cover the radiation absorbing layer 4, and that the face of the incident aperture 51 which opposes the pyroelectric element 53 is formed as the mirror face 57.

In the embodiment, therefore, radiation entering through the incident aperture 51 is incident on the radiation absorbing layer 54, and a radiation component reflected therefrom is reflected from the mirror barrel 56 and the mirror face 57 of the incident aperture 51 to again enter the radiation absorbing layer 54. This process is repeated so that the incident radiation 52 is absorbed by the radiation absorbing layer 54 in the form of heat. The temperature rise is converted by the pyroelectric element 53 into an electric signal, thereby detecting the energy amount of the radiation. In the same manner as the embodiment of FIG. 1, therefore, a high-sensitivity radiation detector in which the wavelength dependence of the sensitivity is eliminated can be obtained.

Figure 14A:
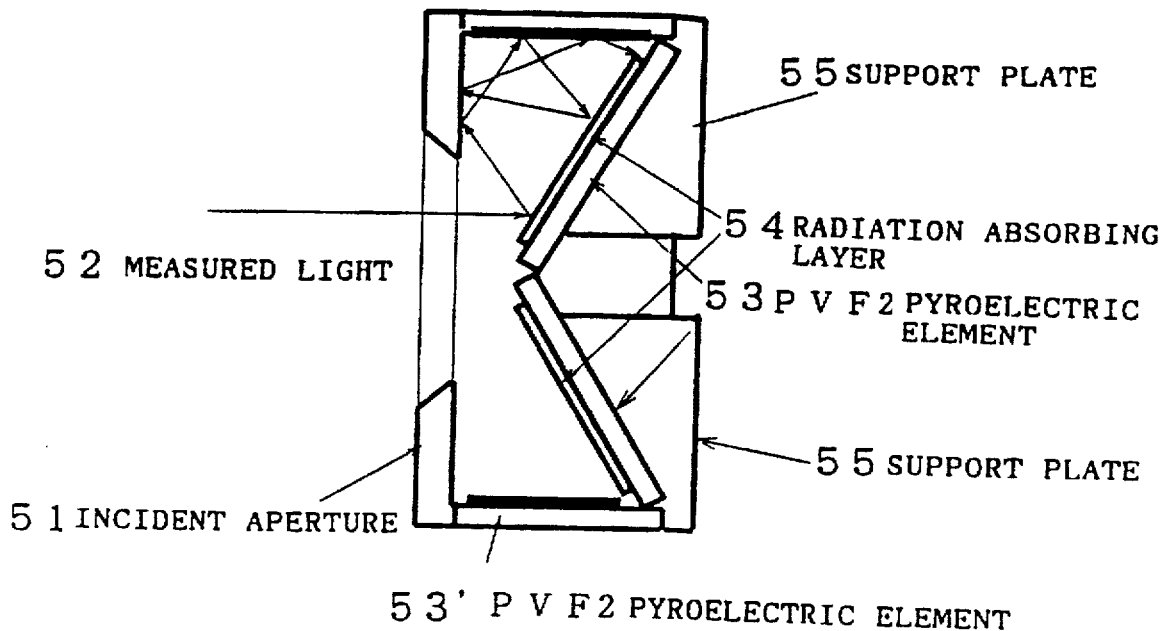
FIG. 14(A) is a longitudinal section view showing the configuration of a radiation detector of an embodiment of the invention.
Figure 14B:
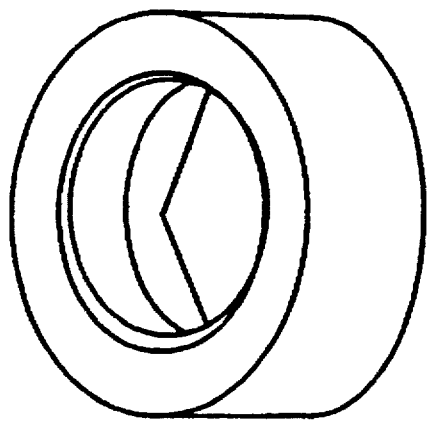
FIG. 14(B) is a perspective view showing the configuration of the radiation detector.

Further the radiation detector of FIGS. 14(A) and 14(B) is an embodiment of the present invention and the second pyroelectric element 53' is provided instead of the tubular mirror 56 of the embodiment of FIG. 13. FIG. 14(A) is a longitudinal section view, and FIG. 14(B) is a perspective view. The wavelength dependence of the sensitivity is eliminated.

Figure 15A:
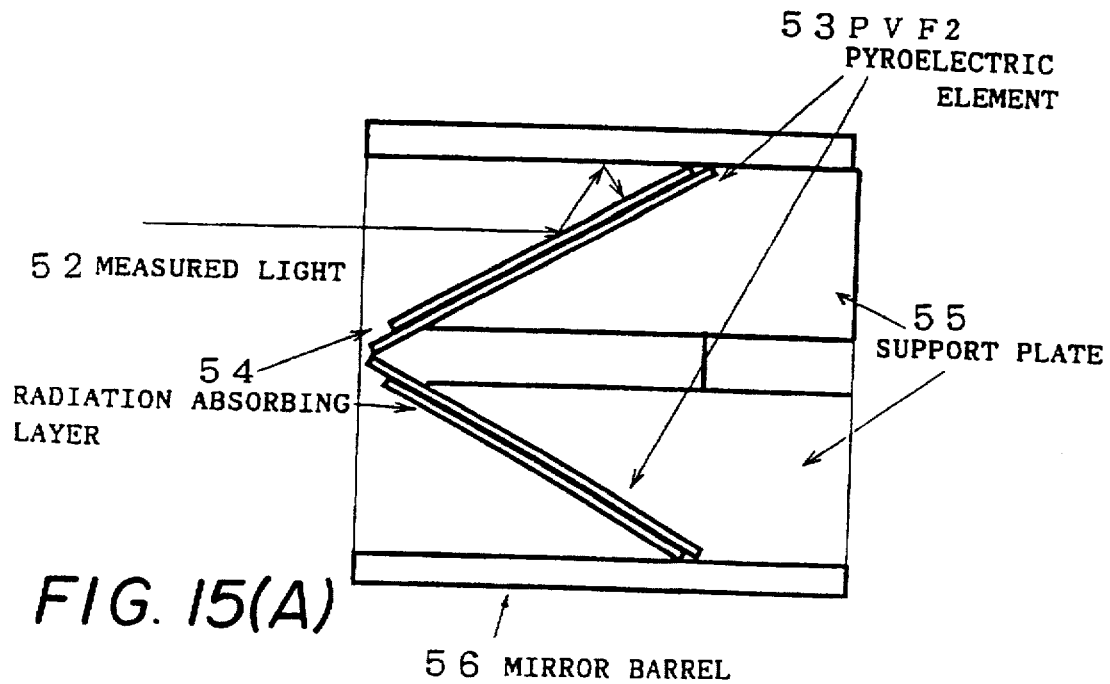
FIG. 15(A) is a longitudinal section view showing the configuration of a radiation detector of an embodiment of the invention.
Figures 15B, 15C:
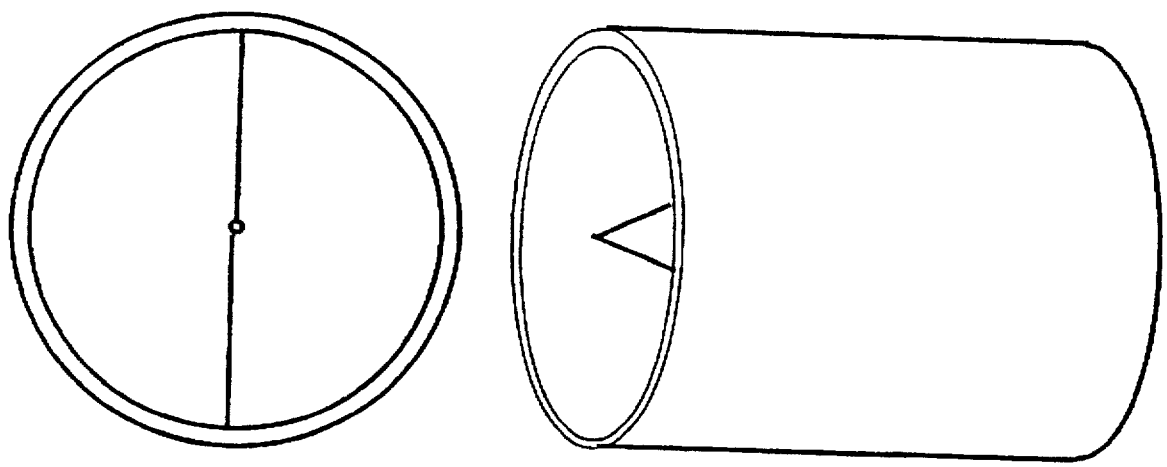
FIG. 15(B) is a front view showing the configuration of the radiation detector.
FIG. 15(C) is a perspective view showing the configuration of the radiation detector.

Further the radiation detector of FIGS. 15(A), (B) and (C) is an embodiment of the present invention where the aperture present in the embodiment of FIG. 13 is eliminated. FIG. 15(A) is a longitudinal section view, FIG. 15(B) is a front view, and FIG. 15(C) is a perspective view. The wavelength dependence of the sensitivity is eliminated.

Figure 16A:
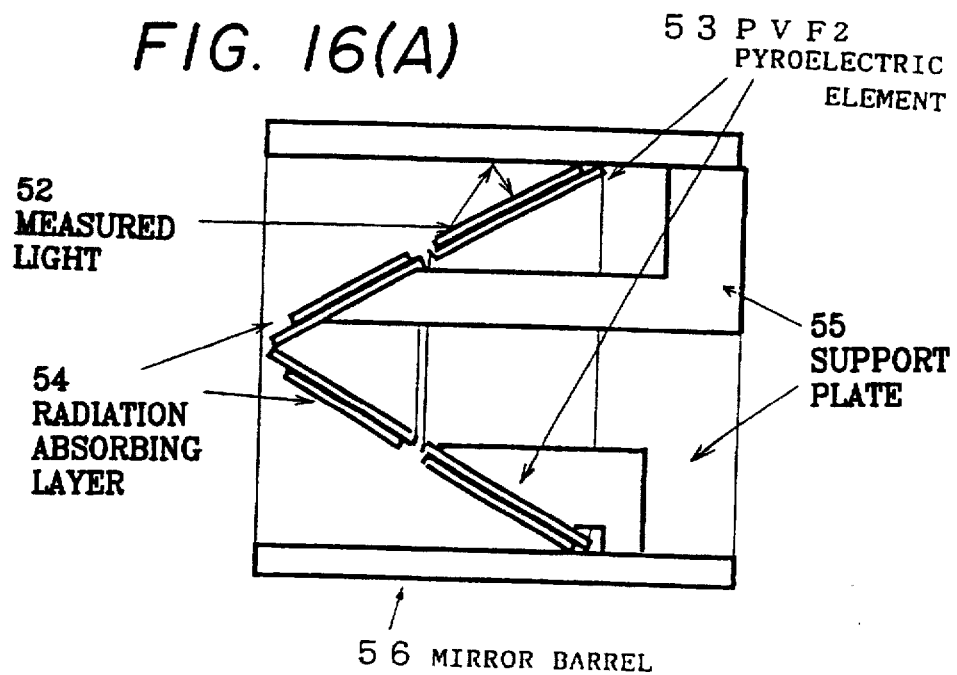
FIG. 16(A) is a longitudinal section view showing the configuration of a radiation detector of an embodiment of the invention.
Figures 16B, 16C:
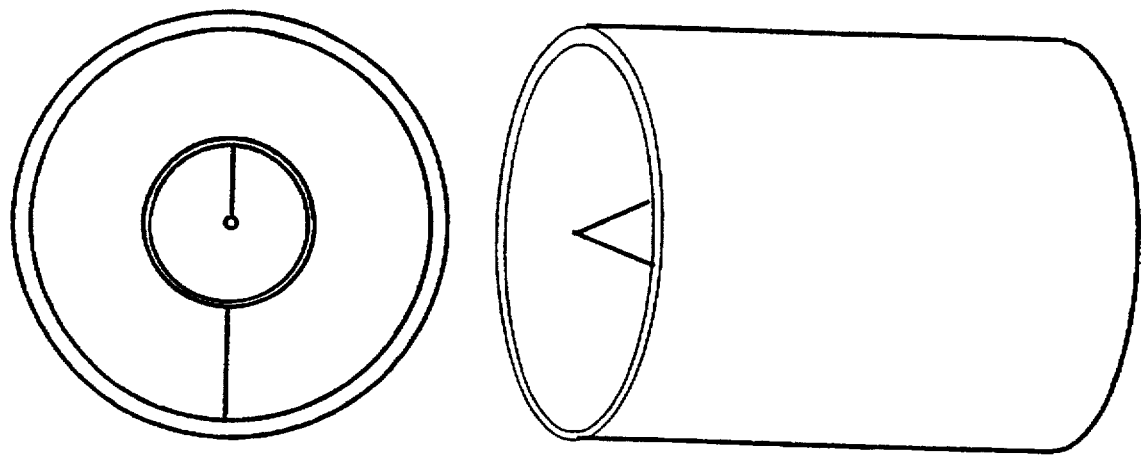
FIG. 16(B) is a front view showing the configuration of the radiation detector.
FIG. 16(C) is a perspective view showing the configuration of the radiation detector

Further the radiation detector of FIGS. 16(A), (B) and (C) is an embodiment of the present invention where the pyroelectric element 53 has a shape which is obtained by dividing the pyroelectric element 53 of the embodiment of FIG. 15. FIG. 16(A) is a longitudinal section view, FIG. 16(B) is a front view, and FIG. 16(C) is a perspective view. The wavelength dependence of the sensitivity is eliminated.

Figure 17A:
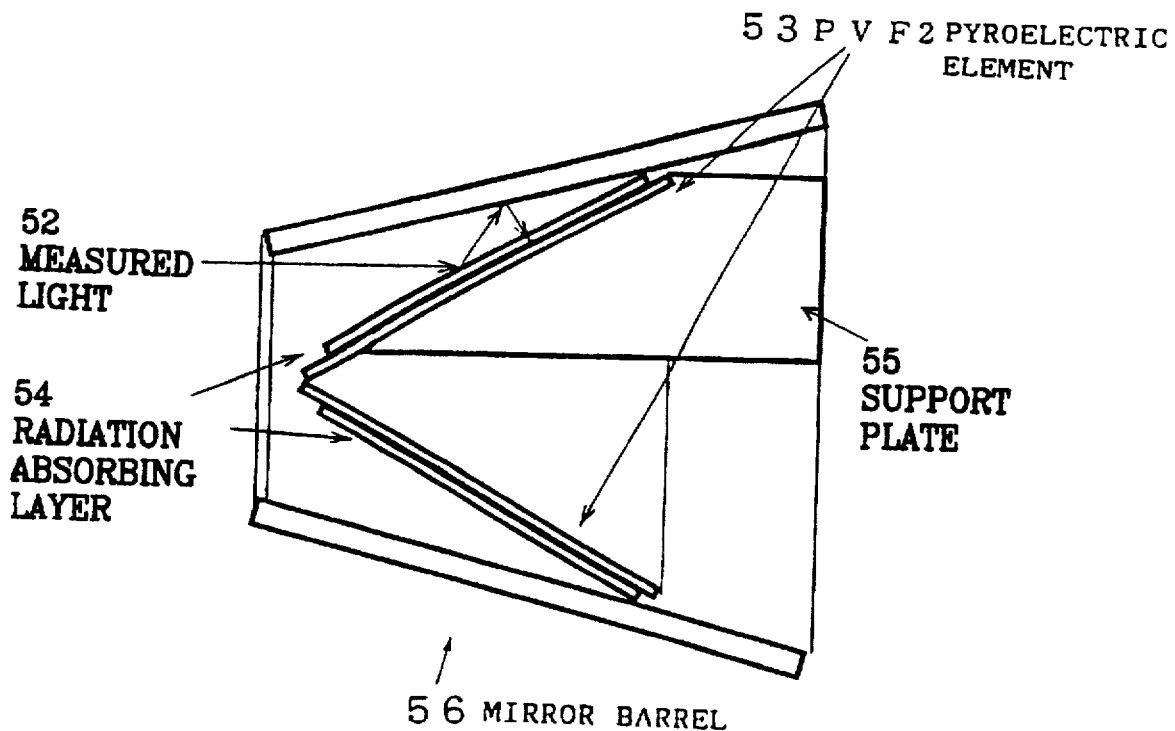
FIG. 17(A) is a longitudinal section view showing the configuration of a radiation detector of an embodiment of the invention.
Figure 17B:
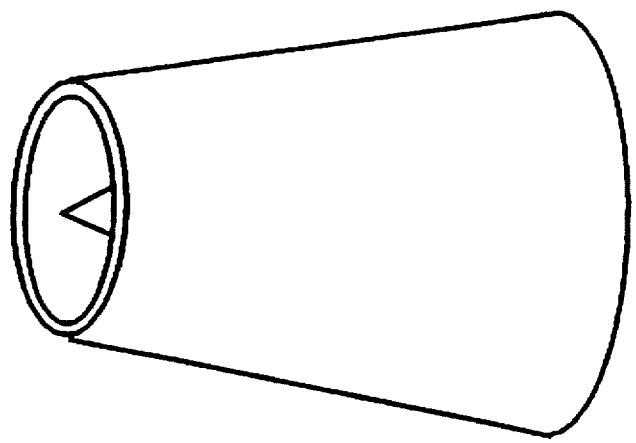
FIG. 17(B) is a perspective view showing the configuration of the radiation detector.

Further the radiation detector of FIGS. 17(A) and (B) is an embodiment of the present invention where the tubular mirror 56 has a truncated conic shape instead of the shape of the tubular mirror of FIG. 15. FIG. 17(A) is a longitudinal section view, and FIG. 17(B) is a perspective view. The wavelength dependence of the sensitivity is eliminated.

Further the radiation detector of FIGS. 18(A) and (B) is an embodiment of the present invention where the shape of the pyroelectric element 53 is also the truncated conic shape instead of the pyroelectric element 53 of FIG. 17. FIG. 18(A) is a longitudinal section view, and FIG. 18(B) is a perspective view. The wavelength dependence of the sensitivity is eliminated.

In the invention, another radiation absorbing material such as NiP may be used in place of gold black.

As described above, according to the invention, a high sensitivity which is 10 to 100 times that of a conventional thermal detector using a thermocouple is attained, the radiation detector can easily be produced without increasing the size of the apparatus, and the temperature drift of the sensitivity does not occur because the measurement is conducted while the pyroelectric element detects the modulated incident light. Consequently, it is possible to realize a radiation detector that has no output temperature drift at ordinary temperature, which is compact, and which has a high sensitivity not depending on the wavelength.

What is claimed is:

1. A radiation detector comprising:

a flexible thermoelectric converting element having an inner face, an opening and a sufficient rigidity to maintain a predetermined shape, and a radiation absorbing layer attached to at least a part of said inner face, said radiation absorbing layer lacking a sufficient rigidity to maintain a predetermined shape, said inner face of said flexible thermoelectric converting element supporting said radiation absorbing layer in a shape consistent with said flexible thermoelectric converting element; wherein said radiation absorbing layer absorbs light to be measured which enters through said opening of said thermoelectric converting element, in a form of heat, and said thermoelectric converting element converts a temperature rise therein into an electric signal, thereby detecting an energy amount of the radiation.

2. A radiation detector according to claim 1, wherein said predetermined shape is a polyhedral shape.

3. A radiation detector according to claim 2, wherein said polyhedral shape is a pyramidal shape.

4. A radiation detector according to claim 1, wherein said predetermined shape is a conic shape.

5. A radiation detector according to claim 1, further comprising:

an electrically and thermally insulating member supporting said thermoelectric converting element having said predetermined shape.

6. A radiation detector comprising:

a flexible thermoelectric converting element having an inner face and having a conic shape, a truncated conic shape, a pyramidal shape, or a truncated pyramidal shape and a sufficient rigidity to maintain said conic shape, said truncated conic shape, said pyramidal shape or said truncated pyramidal shape; and a radiation absorbing layer attached to at least a part of said inner face, said radiation absorbing layer lacking a sufficient rigidity to maintain said conic shape, said truncated conic shape, said pyramidal shape or said truncated pyramidal shape, said inner face of said flexible thermoelectric converting element supporting said radiation absorbing layer in a shape consistent with said flexible thermoelectric converting element, wherein said radiation absorbing layer absorbs light to be measured which enters through an opening of a bottom face of said thermoelectric converting element in a form of heat, and said thermoelectric converting element converts a temperature rise therein into an electric signal, thereby detecting an energy amount of the radiation.

7. A radiation detector according to claim 6, further comprising:

an electrically and thermally insulating member supporting said thermoelectric converting element having said shape.

8. A radiation detector comprising:

a flexible thermoelectric converting device having an inner face and having a conic shape, a truncated conic shape, a pyramidal shape, or a truncated pyramidal shape, and a sufficient rigidity to maintain said conic shape, said truncated conic shape, said pyramidal shape, or said truncated pyramidal shape, said flexible thermoelectric converting device being formed by a predetermined number of thermoelectric converting elements;

a radiation absorbing layer attached to at least a part of said inner face of said flexible thermoelectric converting device, said radiation absorbing layer lacking a sufficient rigidity to maintain said conic shape, said truncated conic shape, said pyramidal shape or said truncated pyramidal shape, said inner face of said flexible thermoelectric converting device supporting said radiation absorbing layer in a shape consistent with said flexible thermoelectric converting device; wherein said thermoelectric converting elements are electrically connected in series so that polarities of electric generation are aligned in one direction, and said thermoelectric converting elements convert radiation of light to be measured which enters through an opening of a bottom face formed by said thermoelectric converting device, into an electric signal, thereby detecting an energy amount of the radiation.

9. A radiation detector according to claim 8, wherein:

each of said thermoelectric converting elements has a shape which is obtained by dividing a conic shape, a truncated conic shape, a pyramidal shape, or a truncated pyramidal shape in an axial direction, into a predetermined number of portions.

10. A radiation detector according to claim 8, wherein:

each of said thermoelectric converting elements has a shape which is obtained by dividing a conic shape, a truncated conic shape, a pyramidal shape, or a truncated pyramidal shape in a direction perpendicular to an axial direction, into a predetermined number of portions.

11. A radiation detector according to claim 8, further comprising:

an electrically and thermally insulating member supporting said thermoelectric converting device having said shape.

12. A radiation detector comprising:

at least one thermoelectric converting element having an inner face;

a radiation absorbing layer attached to said inner face; and at least one mirror having an inner mirror face; wherein said radiation absorbing layer absorbs radiation of light to be measured, which enters through an opening of a bottom face of a cone, a truncated cone, a pyramid, or a truncated pyramid formed by said at least one thermoelectric converting element and said at least one mirror, in a form of heat, and said thermoelectric converting element converts a temperature rise into an electric signal, thereby detecting an energy amount of the radiation.

13. A radiation detector according to claim 12, wherein:

said at least one thermoelectric converting element or said at least one mirror has a shape which is obtained by dividing a conic shape, a truncated conic shape, a pyramidal shape, or a truncated pyramidal shape in an axial direction, into a predetermined number of portions.

14. A radiation detector according to claim 12, wherein:

said at least one thermoelectric converting element or said at least one mirror has a shape which is obtained by dividing a conic shape, a truncated conic shape, a pyramidal shape, or a truncated pyramidal shape in a direction perpendicular to an axial direction, into a predetermined number of portions.

15. A radiation detector according to claim 12, further comprising:

an electrically and thermally insulating member supporting said thermoelectric converting element having said shape.

16. A radiation detector comprising:

a thermoelectric converting element having a conic shape, a truncated conic shape, a pyramidal shape, or a truncated pyramidal shape and an outer face;

a radiation absorbing layer attached to at least a part of said outer face; and a mirror barrel, having an inner face, which houses said thermoelectric converting element, at least a part of said inner face being a mirror face, wherein:

radiation which enters said mirror barrel enters into said radiation absorbing layer, a reflected radiation component is reflected from said mirror barrel to again enter said radiation absorbing layer, said radiation absorbing layer absorbs entering radiation in a form of heat as a result of repeated entering and reflecting processes, and said thermoelectric converting element converts a temperature rise into an electric signal, thereby detecting an energy amount of the radiation.

17. A radiation detector according to claim 16, further comprising:

an incident aperture formed in an opening of said mirror barrel, wherein radiation enters said mirror barrel through said incident aperture.

18. A radiation detector according to claim 16, wherein said mirror barrel has a truncated conic shape, or a truncated pyramidal shape, and a portion of said mirror barrel in a side of said opening has a tapered shape.

19. A radiation detector comprising:

a first thermoelectric converting element having a conic shape, a truncated conic shape, a pyramidal shape, or a truncated pyramidal shape and an outer face;

a first radiation absorbing layer attached to at least a part of said outer face;

a second tubular thermoelectric converting element housing said first thermoelectric converting element and having an inner face and an opening; and a second radiation absorbing layer attached to at least a part of said inner face of said second tubular thermoelectric converting element, wherein radiation which enters said opening of said second tubular thermoelectric converting element enters into said first radiation absorbing layer, a reflected radiation component is reflected from said second thermoelectric converting element to enter said first radiation absorbing layer, said first radiation absorbing layer absorbs entering radiation in a form of heat as a result of repeated entering and reflecting processes, and said thermoelectric converting elements convert a temperature rise into an electric signal, thereby detecting an energy amount of the radiation.

20. A radiation detector according to claim 19, further comprising:

an incident aperture formed in said opening of said second tubular thermoelectric converting element, wherein radiation enters said second tubular thermoelectric converting element through said incident aperture.

21. A radiation detector according to claim 19, wherein said second tubular thermoelectric converting element has a truncated conic shape, or a truncated pyramidal shape, and a portion of said element in a side of said opening has a tapered shape.

22. A radiation detector, comprising:

a flexible thermoelectric converting element having an inner face, an opening and a sufficient rigidity to maintain a predetermined shape;

an electrically and thermally insulating member supporting said thermoelectric converting element having said predetermined shape; and a radiation absorbing layer attached to at least a part of said inner face of said thermoelectric converting element, said radiation absorbing layer absorbs light to be measured which enters through said opening of said thermoelectric converting element, in a form of heat, and said thermoelectric converting element converts a temperature rise into an electric signal, thereby detecting an energy amount of the radiation.

23. A radiation detector according to claim 22, wherein said thermoelectric converting element comprises pyroelectric film and said radiation absorbing layer comprises metal black, black coating or gold black.

24. A radiation detector, comprising:

a flexible thermoelectric converting element having an inner face, an opening and a sufficient rigidity to maintain a predetermined shape;

a support member supporting said thermoelectric converting element having said predetermined shape, said support member having a different shape than said predetermined shape of said thermoelectric converting element; and a radiation absorbing layer attached to at least a part of said inner face of said thermoelectric converting element, wherein said radiation absorbing layer absorbs light to be measured which enters through said opening of said thermoelectric converting element, in a form of heat, and said thermoelectric converting element converts a temperature rise into an electric signal, thereby detecting an energy amount of the radiation.

25. A radiation detector according to claim 24, wherein said thermoelectric converting element comprises pyroelectric film and said radiation absorbing layer comprises metal black, black coating or gold black.

* * * * *

UNITED STATES PATENT AND TRADEMARK OFFICE
CERTIFICATE OF CORRECTION

PATENT NO. : 5,739,533
DATED : April 14, 1998
INVENTOR(S) : Okubo et al.

It is certified that error appears in the above-indentified patent and that said Letters Patent is hereby corrected as shown below:

On the title page, item [73]:

Please change "Matsushita Industrial Co., Ltd." to --Matsushita Electric Industrial Co., Ltd.--;

Signed and Sealed this

Twenty-eighth Day of September, 1999

*Attest:*

Q. TODD DICKINSON

*Attesting Officer*      *Acting Commissioner of Patents and Trademarks*